Dec. 13, 1938.     E. BREITLING     2,139,718
CASH REGISTER, ACCOUNTING, AND THE LIKE MACHINE
Filed Aug. 5, 1935     7 Sheets-Sheet 1

Inventor
Ernst Breitling
By
His Attorney

Dec. 13, 1938.  E. BREITLING  2,139,718
CASH REGISTER, ACCOUNTING, AND THE LIKE MACHINE
Filed Aug. 5, 1935  7 Sheets-Sheet 2

Fig.2

Inventor
Ernst Breitling
By
Carl Benst
His Attorney

Dec. 13, 1938.  E. BREITLING  2,139,718
CASH REGISTER, ACCOUNTING, AND THE LIKE MACHINE
Filed Aug. 5, 1935   7 Sheets-Sheet 3

Inventor
Ernst Breitling
By
Earl Benst
His Attorney

Dec. 13, 1938.  E. BREITLING  2,139,718
CASH REGISTER, ACCOUNTING, AND THE LIKE MACHINE
Filed Aug. 5, 1935  7 Sheets-Sheet 5

Inventor
Ernst Breitling
By
Earl Bernt
His Attorney

Dec. 13, 1938.   E. BREITLING   2,139,718
CASH REGISTER, ACCOUNTING, AND THE LIKE MACHINE
Filed Aug. 5, 1935   7 Sheets-Sheet 6

Inventor
Ernst Breitling
By
His Attorney

Dec. 13, 1938.   E. BREITLING   2,139,718
CASH REGISTER, ACCOUNTING, AND THE LIKE MACHINE
Filed Aug. 5, 1935   7 Sheets-Sheet 7

Inventor
Ernst Breitling
By
Earl Benst
His Attorney

Patented Dec. 13, 1938

2,139,718

UNITED STATES PATENT OFFICE 2,139,718

CASH REGISTER, ACCOUNTING, AND THE LIKE MACHINE

Ernst Breitling, Berlin-Tempelhof, Germany, assignor to The National Cash Register Company, Dayton, Ohio, a corporation of Maryland Application August 5, 1935, Serial No. 34,766
In Germany July 1, 1935

10 Claims.  (Cl. 235—8)

The invention relates to a cash register, accounting or the like machine and more particularly to machines provided with a zero eliminating device as shown and described in the United States Patent No. 2,110,903, issued to Breitling and Palzelt on March 15, 1938.

The main object of the invention is to adapt a zero eliminating device in such a way that asterisks, or no characters at all, are printed to the left of the digit of the highest denominational order and one or several ciphers are printed to the right of the highest denomination, even though a digit follows the zeroes in the lower orders.

Another object of the invention is to adapt a differential device to cooperate with a zero eliminating device in such a way that the differential members can receive a step of movement which is not transmitted to the totalizer when engaged.

Another object of the invention is to arrange a reliable and efficient means for connecting the setting members to control the zero stop pawl and being controlled thereby, under certain working conditions.

Another object of the invention is to connect the zero stop pawls of the various denominational orders in such a way that they are controlled either by a key depressed or the machine drive.

Still further objects of the invention will be pointed out in the following detailed description with reference to the annexed drawings.

A preferred form of an embodiment of the invention is shown in the annexed drawings.

Of said drawings:

Fig. 8 is a part view of Fig. 2, Figs. 9 and 10 show the zero stop pawls in non-effective position in front and top view, with a key depressed, Fig. 11 is a part view of Fig. 2, Figs. 12 and 13 show the zero stop pawls in another position in front and top view, with no key depressed.

GENERAL DESCRIPTION

In the above-mentioned Patent No. 2,110,903 a zero printing and eliminating device is shown and described, which is controlled by the zero stop pawls of the various key banks, associated with type and indicating wheels having the zeros and asterisks distanced from one another by ten steps. Preferably asterisks are printed when the differential device is arrested by the zero stop pawl, but zeros when the differential device has reached its uppermost set position.

When a key of any key bank is depressed, all the zero stop pawls of lower denominational order than that in which a key is depressed are moved into their inoperative positions at the start of the machine operation to permit the differentials of the lower orders to set the type carriers associated therewith to zero, and in all the denominational orders to the left of the digit of the highest order the zero stop pawls arrest the differentials associated therewith in position to set up an asterisk.

In order to render such a zero eliminating device available with a differential device for entering amounts into totalizers when engaged, arrangement is made to render the initial step of the differential non-effective in adding by a non-operative engagement of the totalizers during and for said step.

Thereat the setting member of the differential device consists suitably of two parts: the main setting member and a differential member for engaging the totalizer. Normally, when in the respective order neither a digit nor an asterisk has to be printed, both said members are connected by a latch arranged on the setting member. For setting up a zero at the uppermost set position of the main setting member, the members are disengaged in the zero position, this is accomplished by controlling the coupling pawl so that it is, first, held by the zero stop pawl, and rocked into its ineffective position, then is released by the zero stop pawl being thrown out, so that the setting member is enabled to move, while the uncoupled amount differential member remains in zero position.

In order to control the coupling between setting member and differential member in the above mentioned way, the zero printing device according to the invention is constructed so that by means of depressing a key the zero stop pawl of this bank is thrown out directly by the key, while in the banks of lower denominational orders with no key depressed the respective zero stop pawls are disengaged after the differential and setting members are disconnected.

In order to directly and indirectly control disengagement of the zero stop pawls, the operating connections therefor are adapted to be actuated in such a way that they are rocked either in an approximately vertical direction by a key depressed, or in nearly horizontal direction by the machine drive.

DETAILED DESCRIPTION

*Machine drive*

Figures 1, 4, 14:
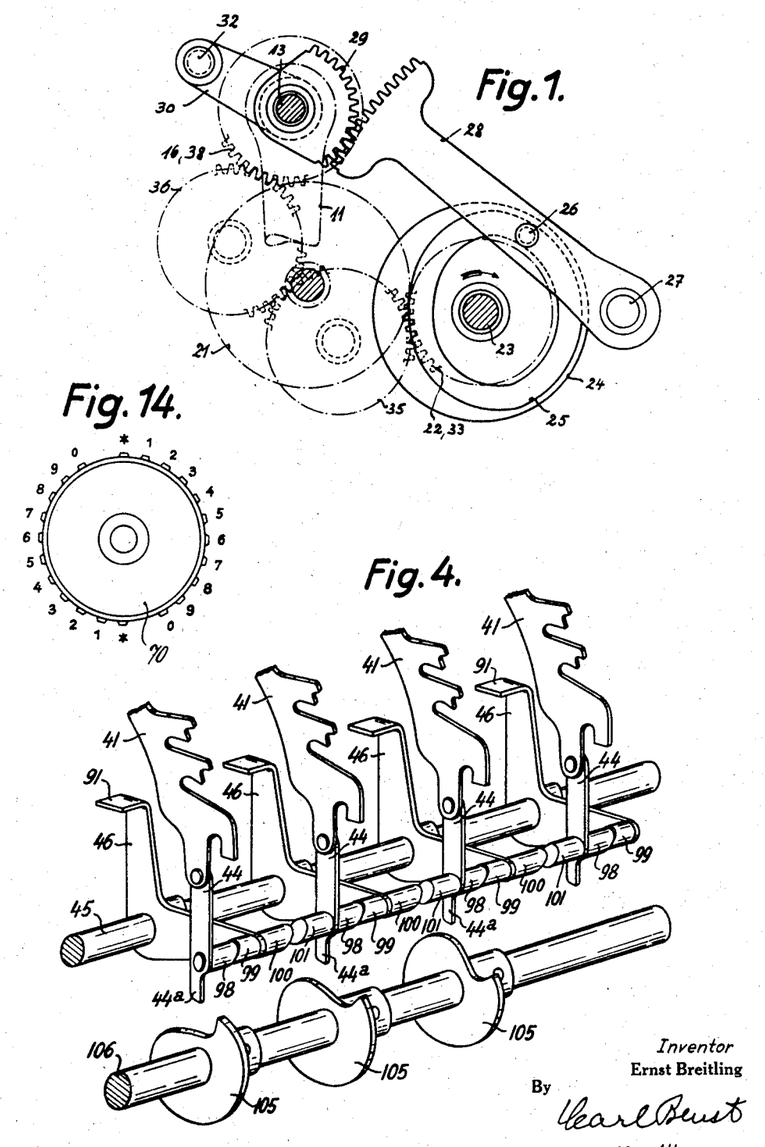
Fig. 1 is a side view of the machine drive.
Fig. 4 is a perspective view of the zero stop pawl and the parts connected therewith.
Fig. 14 illustrates in front view a type wheel.

The machine may be operated by means of a crank handle 11 (Fig. 1) rotatably mounted on a shouldered end 12 of a shaft 13. The shaft 13 is rotatably supported in the side walls 14 and 15 (Fig. 3) of the machine frame. Further, on the shouldered end 12 of the shaft 13 is rotatably mounted a gear 16 the hub 17 of which is provided with recesses 18 to be engaged by coupling studs 19 of the crank hub 20. The gear 16 is in engagement with a gear 22 on a shaft 23 by means of an intermediate pinion 21 rotatably mounted on a stationary stud of the side wall 14. The gears 22 and 16 are of like diameter, so that when the crank 11 is rotated through a full cycle, the shaft 23 also performs a full revolution.

The shaft 23 rotatably supported in the side walls 14 and 15, has secured thereto a cam disk 24 having a curved groove 25 (Figs. 1 and 3) engaged by a roller 26 of an arc-shaped toothed arm 28 pivoted on a stationary stud 27 of the side wall 14. The teeth of the arm 28 mesh with a toothed segment 29 fast on the hub of a carrier 30 secured to the shaft 13. During each machine operation, the cam disk 24 imparts to the arm 28, first, a rotary movement in counterclockwise direction and, thereafter, in clockwise direction. These two rocking movements are transferred, through the toothed segment 29, in the reversed sense to the shaft 13, so that the latter during each machine operation, is rocked first in clockwise and thereafter in counter-clockwise direction. Besides the arm 30, the shaft 13 has secured thereon a further arm 31 (Fig. 3), both said arms supporting a cross rod 32.

Further, the shaft 23 has mounted thereon a gear 33 being, through two intermediate pinions 35 and 36 rotatably mounted on stationary pins of an interposed wall, in engagement with a gear 38 fast to a tube 37 (Fig. 3) surrounding the shaft 13 and rotated, during each machine operation, in the direction opposite to that of the crank.

*Key banks*

The key board of the machine comprises several amount key banks 39 (Fig. 2) to each of which a differential device is associated. Every amount key bank 39 contains nine keys. There might also be key banks provided for setting up data not to be added, for instance, ledger numbers, letters, or month of a date, which may contain any number up to twelve keys. The differential devices for both kinds of key banks may be mounted on the same main shaft 13.

In each key bank, besides a detent 40 provided for keeping depressed any key operated, a second detent or a slide 41 (Figs. 2 and 3) is mounted which is shifted downwardly by means of a pin 42 of the depressed key acting upon its respective oblique edge 43.

Figure 12:
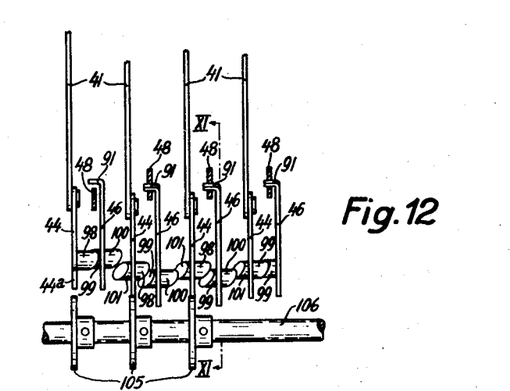
Figure 13:
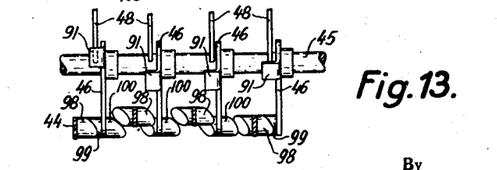

The slide 41 has linked thereto a link 44 (Figs. 2 and 4), having a pin 98 provided with a bevelled surface (see also Figs. 12 and 13) in contact with a bevelled surface of a pin 99 on an adjacent zero stop pawl 46. A stationary bar 92 limits the outward directed movement of the link 44. The pawl 46 is rotatably mounted on a shaft 45, which pawl normally bears against a stationary pin 89 by the action of a torsion spring 47 coiled about the shaft 45. When the said pawl is in normal position, a bent over portion 91 thereof extends over a latch 48 of the differential device holding it in zero position. When, however, a key 39 has been depressed, and by means of its pin 42 the slide 41 is shifted into its lower position, the pin 98 bears upon the pin 99 and, thus, rocks the zero stop pawl 46 directly out of the path of the pawl 48.

*Differential device*

The differential device corresponds essentially to the one shown and described in the copending application Serial No. 26,115, Patent No. 2,088,634, issued August 3, 1937, to which reference may be had for a more detailed description. Hereinafter only so much will be specified as is different from it.

Figure 2:
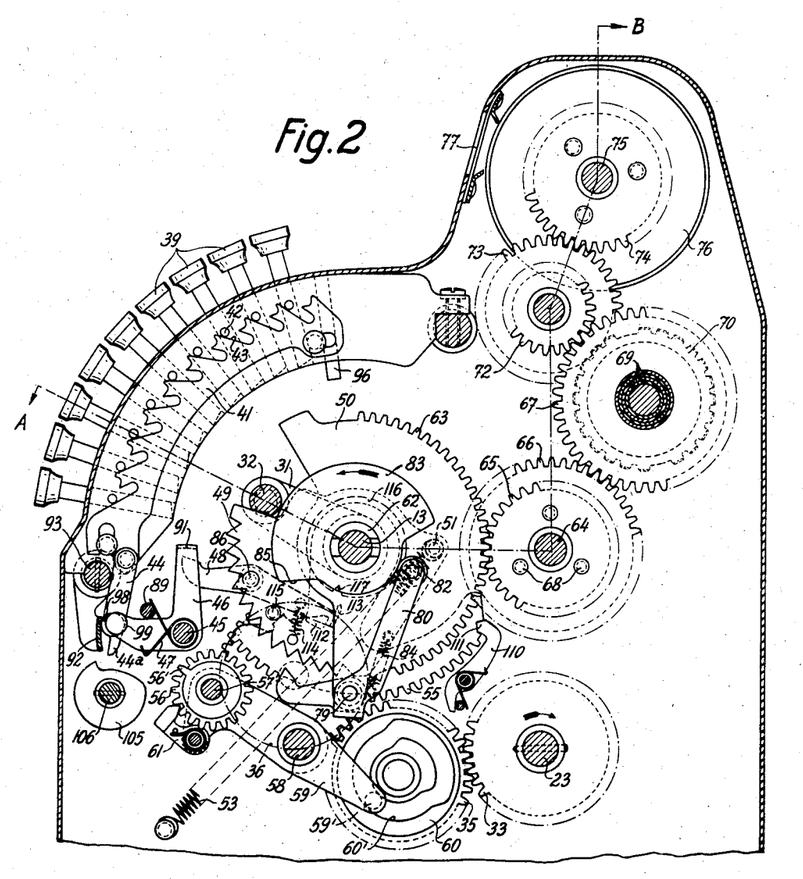
Fig. 2 is a cross section through the machine along an amount differential device.
Figure 3:
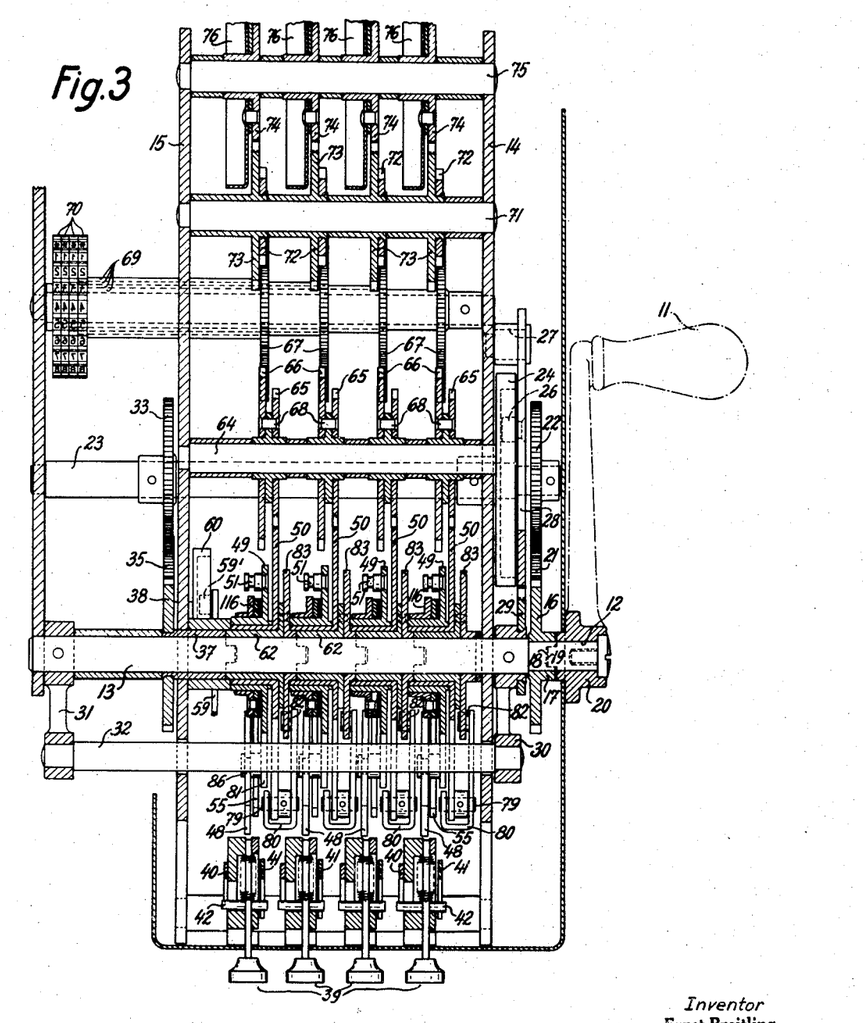
Fig. 3 is a cross section through the machine along line A—B of Fig. 2.
Figure 5:
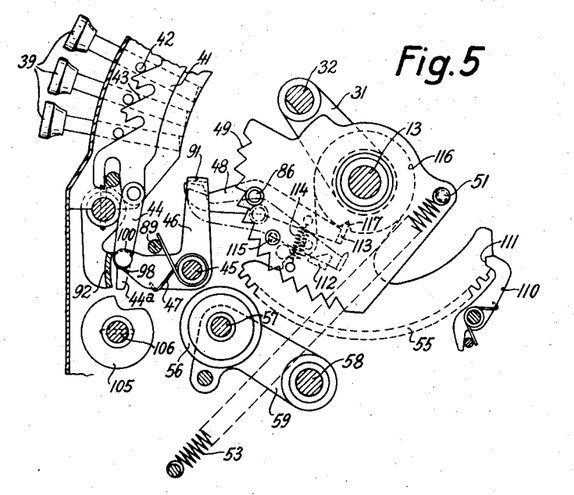
Fig. 5 is a part view of Fig. 2.

Each differential device comprises a main setting member 49 (Fig. 2) rotatably supporting the latch 48 and rotatably mounted on the hub of a respective auxiliary setting member 50 (Fig. 3). Fast to a pin 51 of each of the setting members 49 is a spring 53 tending to rotate it clockwise and, thus, to bear against the cross rod 32.

The auxiliary setting members 50 provided in each differential device, are rotatably mounted on tubes 62 mounted over the shaft 13, which tubes are interconnected with each other by tongues and grooves, and of which tubes the outmost left hand one as per Fig. 3 is connected in the same manner with the tube 37. The teeth 63 of each auxiliary setting member 50 is in mesh with a gear rotatably mounted on a shaft 64. Each gear 65 is fastened by pins 68 to a gear 66 meshing with a gear 67. The gears 67, on the one hand, are connected by means of nested tubes 69 to the type wheel 70 of the printer, on the other hand, they are in mesh with gears 74 through intermediate gears 72, 73 rotatably arranged on a shaft 71. The gears 74 are rotatably mounted on a shaft 75 and connected each with an indicator wheel 76. The indicator wheels 76 are visible through a window 77 of the machine frame.

A stud 79 of each auxiliary setting member 50 has pivoted thereon a bail formed coupling member 80. The one arm of the member 80 is pointed and able to engage the teeth 81 of the respective setting member 49. The other arm of the coupling member 80 carries a roller 82 cooperating with a cam disk 83 rotatably mounted on the shaft 13 and connected to the respective tube 62. By means of a spring 84 tensioned between the coupling member 80 and the auxiliary setting member 50, the pointed arm is normally held disengaged from the teeth 81.

In order to use this differential device not only for setting up printing and indicating wheels, but also for amount entering, each main setting member 49 has allotted thereto a differential member 55 rotatably mounted on the hub of the main setting member 49 and held in its normal position by a locking pawl 110 engaging the notch 111. The differential member 55 carries a lug 112 engaged from behind by an extension 113 of the pawl 48, the latter contacting normally under the action of a spring 114 a stationary pin 115 of the setting member 49. For reasons which will be set forth hereinafter, the members 112 and 113 are arranged apart from one another the gap between them being somewhat smaller than an interval between two teeth.

The device operates as follows:—

Figure 8:
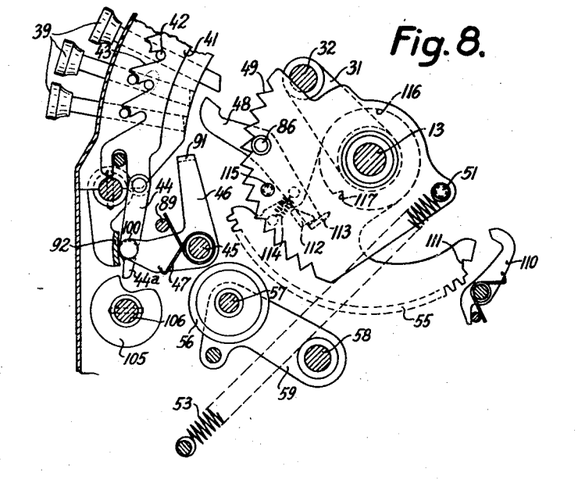

Assumed, the zero stop pawl 46 has been rocked to free the latch 48 by depressing an amount key 39 (Figs. 2 and 8). During the machine operation effected by turning the crank handle 11, the shaft 13 and thereby also the cross rod 32, is rocked first in clockwise direction (Fig. 2) by means of the gearing 16 to 29. The setting member 49 partakes in this clockwise rocking under the action of its spring 53 while the differential member 55 is not carried along at first, as it is yieldingly arrested by the locking pawl 110. Only after the setting member 49 has been moved far enough to close the gap between the lug 113 and the extension 112, does the setting member carry the differential member 55 along. When the latch 48 strikes the foot of the depressed key 39, the setting member 49 is arrested. When the free end of the pawl 48 strikes the depressed key, it rocks counter-clockwisely about its pivot 86 till its rearward extension 113 enters the notch 117 of a stop disk 116 fastened to the member 55. Thereby, not only the setting member 49, but also the said member 55 is arrested. Since it requires some movement of the setting member 49 to completely disengage 113 from 112, the member 49 receives a slight rocking movement after the pawl 48 strikes the depressed key. This movement of the member 49, plus the initial movement thereof to close the gap between 112 and 113, equals the distance of one tooth space of the member 49. The cross rod 32 continuing its clockwise rotation meets the auxiliary setting member 50 and restores it as well as the type wheels 70 by means of the gearing 65 to 69 and the indicator wheels 76 by means of the gearing 71 to 74 to blank position being one step in advance of the asterisk position. Thereupon the oblique surface 85 of the cam disk 83 performing during a machine operation a full revolution in counter-clockwise direction, strikes the roller 82 and forces the pointed arm of the coupling member 80 to engage, against the action of its spring 84, the locking teeth 81 of the main setting member 49 which has been set one step more than the value of the depressed keys 39 necessitates.

For an adding operation, the adding wheels 56 are, at this time, engaged with the differential members 55 by means of rocking the totalizer frame 57 to 59 by the cam disk 60 in the groove 60' of which the roller 59' of the frame arm 59 is guided. Thereupon the shaft 13 starts its counter-clockwise return movement, whereupon the cross rod 32 restores the main setting member 49 to rest position against the action of its spring 53 by tensioning it. When the setting member 49 starts its return movement, the pawl 48 is disengaged from the stem of the key depressed, so that the spring 114 is enabled to bring the pawl 48 again in contact with the pin 115. After the setting member 49 has been moved by one step, the pin 115 contacts the differential member 55 and restores it also to normal position, whereby the amount corresponding to the value of the depressed key, is transferred to the appropriate adding wheel 56. At the same time, the auxiliary setting member 50 and the setting member 49 coupled therewith by the coupling member 80 actuated by the cam disk 83 are rocked out of their zero positions by a number of steps corresponding to the number of steps the setting member has been restored. Due thereto, also the type wheels 70 and the indicator elements 76 are set in accordance with the value of the key depressed. After setting of the type wheels 70 and the indicator wheels 76 is finished, the cam of greater diameter of the cam disk 83 leaves the roller 82 so that the coupling member 80 under the action of the spring 84 is disengaged from the teeth 81 of the main setting member 49 as well as the main setting member from the auxiliary setting member 49. After the return movement of the auxiliary setting member 49 has been finished, the adding wheels 56 are disengaged from the differential member 55.

*Zero printing and eliminating device*

Figure 6:
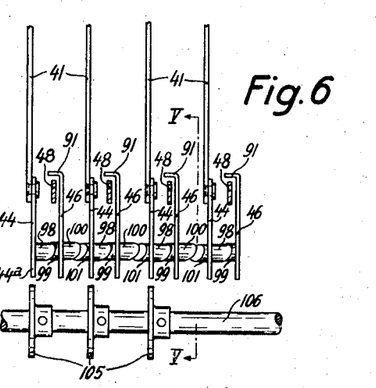
Figs. 6 and 7 show the zero stop pawls in front and top view, with no key depressed.
Figure 7:
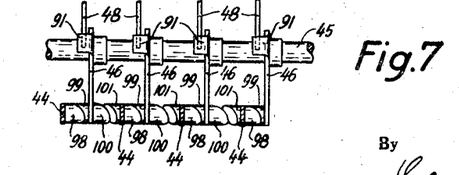

If the zero stop pawl 46 has not been disengaged (Figs. 2 and 6), the pawl 48 strikes the bent over portion 91 of the zero stop pawl 46 immediately at the beginning of the machine operation, thus rocking the pawl 48 counterclockwise, and the main setting member 49 is moved out of its zero position by one step, which movement is enough to enter the rearward extension 113 of the said pawl 48 into the notch 117 of the disk 116, thus arresting the setting member 49, as well as the differential member 55, in their normal positions. By the continued movement of the cross rod 32 the auxiliary setting member 50 is moved into its end position and the corresponding printing and indicating wheels are moved to a like extent. During the return movement of the cross rod 32 the main setting member 49 is restored by one unit to its rest position, whereby the auxiliary differential member 50 coupled therewith, is moved out of the rest position into the zero position, in which, however, no "0" but an asterisk is printed and indicated, respectively, as according to the arrangement of the characters on the type wheels and the indicator wheels the asterisks and the zeros are distanced from one another by ten steps (see Fig. 14).

In order to have a "0" printed in the denominational orders to the right of the digit in which a key has been depressed, the following arrangement has been made:—

It has already been mentioned that each zero stop pawl 46 has a pin 99 (Figs. 2 and 4) having a surface bevelled in the vertical and horizontal direction in contact with a bevelled surface of a pin 98 on the link 44 loosely attached to the detent 41 of each key bank. If by depressing a key 39 the appropriate detent 41 is moved downward, the pin 98 of the link 44, the movement of which to the left is limited by a stationary stop 92, engages the pin 99 and, thus, rocks directly the respective zero stop pawl 46.

Figure 9:
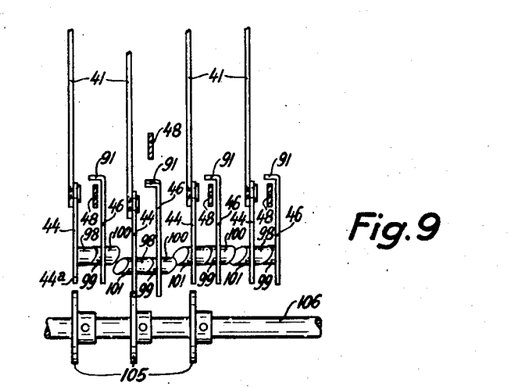
Figure 10:
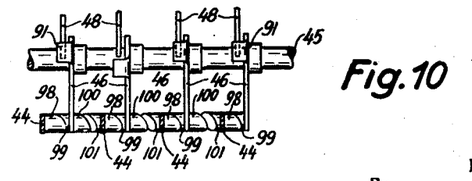
Figure 11:
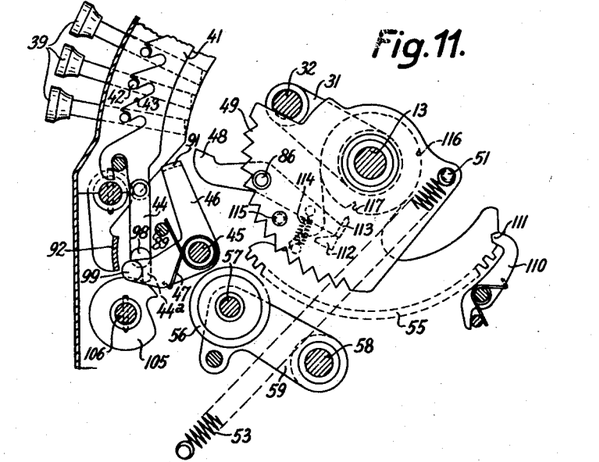

On the right hand side of each zero stop pawl 46 (except that for the lowest denominational order) a pin 100 having also a surface bevelled correspondingly in the vertical and horizontal direction, is provided (Fig. 4) in position to cooperate with the bevelled surface of a pin 101 fast on the left hand side of the link 44 of the next lower order. Normally, the bevelled surfaces of pins 100 and 101 are not in contact, but spaced from one another (see Figs. 4-7) so far that the bevelled surface of the pin 100 comes into contact with the bevelled surface of the pin 101 only when the respective zero stop pawl 46, upon depressing one of the keys 39, that is, upon the downward movement of the respective link 44 with the pin 98, has been rocked (Figs. 8 to 10). Each of the links 44 has an extension 44a which is moved, when the link 44 is moved downward, into the path of a cam disk 105 which when actuated rocks the link 44 inward. The cams of the cam disks 105 are arranged in a helical line on a shaft 106 rotated at the beginning of the machine operation, in such a way that the links 44 lying in their paths, are rocked after one another starting with the highest order. A link 44 so rocked (see Figs. 11 to 13) acts by the bevelled surface of its pin 98 upon the surface of the adjacent pin 99 thereby rocking the corresponding zero stop pawl 46. As the pin 100 of this zero stop pawl 46, during its first rocking movement, has already been brought into contact with the pin 101 of the link 44 of the next lower denominational order, the pin 100 moves the link 44 and detent 41 downward, and by means of the corresponding pins 98, 99 also the zero stop pawl 46 of the next lower order. Thereby the respective pin 100 is moved into contact with the adjacent pin 101 and the extension 44a into the path of the associated cam disk 105 rocking the link 44 inward while the shaft 105 continues rotating, whereby, through the pins 98, 99, 100, 101, the next zero stop pawl 46 is disengaged. By this arrangement the zero stop pawls which are allotted to those orders in which a key has been depressed, are directly disengaged, whereas the zero stop pawls allotted to the orders to the right of the figure of the highest order operated, in which orders no keys have been depressed, are disengaged after one another at the start of the machine operation.

Figure 15:
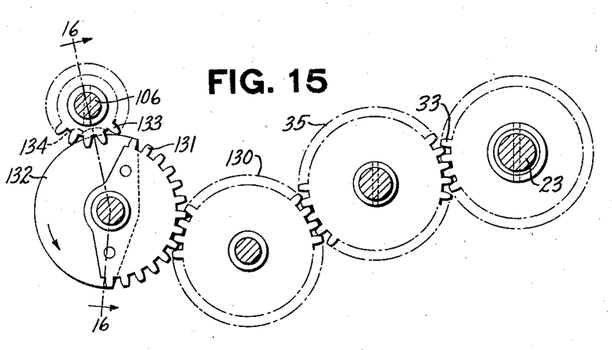
Fig. 15 is a detail view of the train of mechanism for actuating the zero stop pawl actuating cams.
Figure 16:
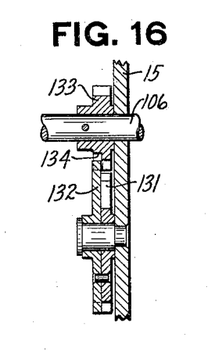
Fig. 16 is a detail view taken on line 16—16 of Fig. 15.
Figure 17:
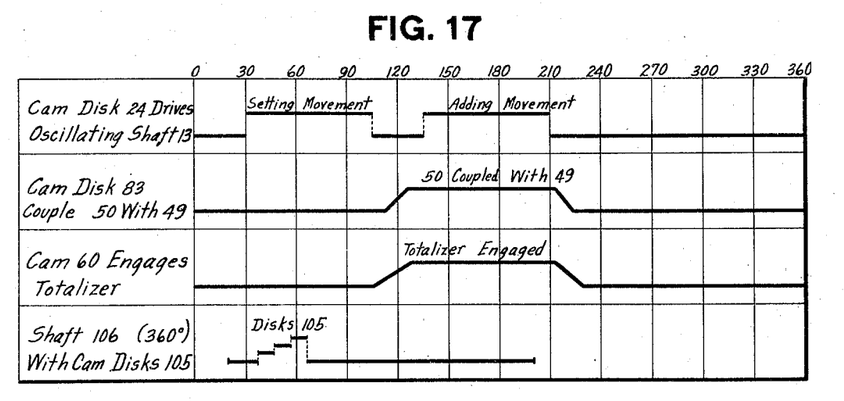
Fig. 17 is a time chart showing the time of operation of the various mechanisms illustrated herein.

The shaft 106 is rotated by a train of gears illustrated in Fig. 15. Meshing with the above mentioned gear 35 is a gear 130, which in turn is in mesh with a segment 131, secured to the side of a locking disk 132. The segment 131 is in the plane of a pinion 133 fast to the shaft 106 and is brought into mesh therewith during the machine operation. While the segment 131 is out of mesh with the pinion 133, the latter, together with the shaft 106, is held against rotation by the locking disk 132, the periphery of which is in engagement with a notch 134 in the side of the pinion. The periphery of the locking disk passes out of the notch 134 when the teeth of the segment come into mesh with the pinion 133. The gear ratio between segment 131 and pinion 133 is such that the shaft 106 is given one complete rotation for each rotation of the main shaft 23.

In a denominational order, in which the zero stop pawl 46 is disengaged in the manner just set forth at the beginning of the machine operation, the differential device operates as follows:—

When the cross rod 32 is started to move in clockwise direction, the setting member 49 follows first by one unit (Fig. 5), whereupon the latch 48 meets the zero stop pawl 46 not yet disengaged, and is rocked thereby so that its rearward extension 113 is moved out of the path of the lug 112 of the differential member 55 and entered into the notch 117. As long as the zero stop pawl is not disengaged, the setting member 49 and the differential member 55 remain locked, even if the cross rod 32 has continued to move. As soon, however, as the zero stop pawl 46 is disengaged by the cam disk 105 (Fig. 11), the spring 114 pulls the latch 48 out of the notch 117; however, the extension 113 is not enabled to engage the lug 112 from behind, as the setting member 49 together with the latch 48 has been moved already by a greater extent than the distance between the members 112, 113. Now, the main setting member 49 is free to follow the cross rod 32 up to its highest set position determined by the stop 96, whereas the differential member 55 is disengaged therefrom and held by the pawl 110 in rest position. When in its highest position the setting member 49 is coupled in the manner described, with the auxiliary setting member 50, so that when the setting member 49 is restored, the corresponding type wheel 70 and the indicator wheel 76 are moved by ten units from the rest position into the "0" position.

The advance of the device according to this invention resides in that a cipher is printed also between two digits of an amount, i. e. for instance, in the amount "505.20" a "0" is printed between the two digits "5".

While the from of mechanism herein shown and described, is admirably adapted to fulfill the objects primarily stated, it is to be understood that it is not intended to confine the invention to the embodiments herein disclosed, for it is susceptible of embodiment in various other forms all coming within the scope of the claims which follow.

What is claimed as new is:

1. In a machine of the class described, the combination of a totalizer, an actuator therefor, a differentially settable member, a latch to latch the actuator to the member whereby the member differentially positions the actuator, said latch normally positioned in such relation to the actuator that the member can move one step before moving the actuator, a pawl normally in position to coact with the latch to move the latch out of one coacting position in relation with the actuator after one step of movement of the member and to move said latch into another position wherein the latch locks the actuator to the member, means to thereafter move the pawl out of coacting position with the latch, and means to disconnect the latch from the actuator after the pawl is moved out of coacting position with the latch to release the member, said member being then movable into a predetermined position after the actuator is released from the member.

2. In a machine of the class described, the combination of a totalizer, an actuator therefor, a differentially settable member, means to move the member from a normal position to a certain position, a further extent to any one of nine positions representing digits from one to nine, and a still further extent into a position representing zero, a latch to latch the actuator to the member whereby the member differentially positions the actuator, said latch normally positioned in such relation to the actuator that the member can move one step before moving the actuator, a pawl normally in position to coact with the latch to move the latch out of one coacting position with the actuator after one step of movement of the member and to move said latch into another position wherein the latch locks the actuator to the member, means to thereafter move the pawl out of coacting position with the latch, and means to disconnect the latch from the actuator to unlock the actuator from the member after the pawl is moved out of coacting position with the latch to release the member, said member being then moved by its moving means into the said position representing zero.

3. In a machine of the class described, the combination of a totalizer, an actuator therefor, a differentially settable member, means to move the member, a latch carried by the member to connect the actuator to the member whereby the member differentially positions the actuator, a pawl normally in position to coact with the latch to move the latch out of one coacting position in relation to the actuator upon movement of the member and simultaneously move the latch into another position in which it locks the actuator to the member, means operable during the machine operation to withdraw the pawl from coaction with the latch, means to move the latch to unlock the member for operation after the pawl is withdrawn from coaction with the latch, and means to hold the actuator in its normal position while the member is moved to a certain position.

4. In a machine of the class described, the combination of a totalizer, a plurality of amount differential mechanisms, a set of manipulative devices to control each differential mechanism normally in neutral position, said differential mechanisms including a totalizer actuator and a member differentially positionable to determine the extent of movement of the actuator when the actuator is moved to enter amounts in the totalizer, a latch to connect each actuator with its associated member, and means controlled by the manipulative devices associated with a higher order differential to disconnect the latch associated with the next lower order differential from the actuator of said last named lower order differential to free the member associated therewith to move to a certain position.

5. In a machine of the class described, the combination of a plurality of differential mechanisms of different denominational values, each differential including an actuator and a differentially positionable member, amount keys to control the differential mechanisms, a pawl associated with each differential mechanism to normally arrest the differential in a certain position, means coacting with the pawls and operated by the depressed keys in each order to move the pawls associated with the orders in which the keys are depressed to non-arresting positions, and means cooperating with the last-named means after the differentials have been arrested by the pawls to move the pawls in all orders lower than that in which a key has been depressed into non-arresting position to release the members in said lower orders after the actuators have been arrested, whereby the actuators remain in said certain position and the members move to other positions.

6. In a machine of the class described, the combination of a plurality of differential mechanisms of different denominational values, each differential including an actuator and a differentially positionable member, amount keys to control the differential mechanisms, a pawl associated with each differential mechanism to normally arrest the differential in a certain position, a shaft rotated during every machine operation, a series of cams arranged on the shaft, one for each denominational order except the lowest order, a device positioned into the path of a cam associated with a denominational row of keys when a key is depressed in the associated row of keys, said device being subsequently operated by its associated cam, and connections between the device and the pawl of next lower order to withdraw the lower order pawl upon operation of the device by its cam, whereby the member is released to move into a certain position while the actuator remains in said certain position.

7. In a zero printing control mechanism for a machine of the class described, the combination of a differential mechanism for each of a plurality of denominational orders, a totalizer, a printing mechanism, each of said differential mechanisms including a member differentially positionable under control of amount keys, a latch carried by each member, a totalizer actuator connected to each member by said latch, the connection between said member and actuator allowing one step of movement to the member before it moves the actuator and said one step of movement being used to set the printing means to a certain position, means coacting with the latch to disconnect the actuator from the member after the member has moved said one step, and means controlled by an amount key of higher order for releasing the latch in the lower adjacent order after said one step of movement, whereby the member may be moved independently of the actuator from said certain position to a position to print a zero when a significant digit has been set up on the higher order keys.

8. In a machine of the class described, the combination of a totalizer, a plurality of actuators of different denominations therefor, a differentially settable member for each denominational actuator, manipulative devices to control the differential setting of each member, means to move each member, a latch carried by each member to normally connect each actuator to its associated member whereby each actuator may be differentially positioned by the member, a pawl normally coacting with each latch to disconnect its associated actuator from its associated member when the associated member is moved and to maintain the member in the moved position, connections between the manipulative devices and the pawls to withdraw an associated pawl from coaction with its latch, upon manipulation of any one of the manipulative devices, and means operable during a machine operation to withdraw the pawls, of orders lower than the order in which a pawl is withdrawn by an associated manipulative device, from coaction with the latches in sequential order beginning with the highest of said lower denominational orders, whereby the lower order members can be differentially positioned without positioning the actuators.

9. In a zero printing control mechanism for a machine of the class described, the combination of an amount keyboard including key banks related to different denominational orders, a detent in each bank, a link loosely mounted on each detent and carrying a stud on each side thereof, said studs having bevelled working surfaces, a differential mechanism controlled by each key bank to control printing means, a zero stop pawl related to each detent, said pawls having studs on each side thereof, the pawls being mounted between the detents so that the bevelled surfaces of a stud on a link and a stud on an adjacent pawl are in operating alinement, the stud on the link and the stud on its related pawl being in engagement so that the operation of the detent will shift its related pawl, one of the studs on the pawl and one of the studs on the link of the next lower order being normally out of engagement with each other, but moved into engagement with each other when the pawl is operated by its detent, and means for giving the link on the actuated detent a second movement, whereby its pawl actuates the link of the next lower order to move the pawl in that order to release the differential mechanism for movement, so that a zero may be printed in the lower order when no key has been depressed in said lower order and a key has been depressed in a higher order.

10. In a machine of the class described, the combination of a plurality of differential mechanisms of different denominational values, each differential including an actuator and a differentially positionable member, amount keys to control the differential mechanisms, a pawl associated with each differential mechanism to normally arrest the differential in a certain position, means operable during each machine operation to move the pawls of lower order denominations to non-arresting positions after the actuators associated therewith have been arrested, and means controlled by the keys of next higher orders to control the effectivity of the last named means to release the lower order members after the lower order actuators have been arrested, whereby the members move to a certain position while the actuators remain in their arrested positions.

ERNST BREITLING.